United States Patent [19]

David, Jr. et al.

[11] Patent Number: 4,473,276

[45] Date of Patent: Sep. 25, 1984

[54] ACOUSTO-OPTIC DEFLECTOR UTILIZING INTERNAL DEFLECTION

[75] Inventors: Edward H. David, Jr.; Otis G. Zehl, both of College Park; Michael G. Price, Seakbrook, all of Md.

[73] Assignee: Litton Systems, Inc., College Park, Md.

[21] Appl. No.: 342,572

[22] Filed: Jan. 25, 1982

[51] Int. Cl.$^3$ .............................................. G02F 1/33
[52] U.S. Cl. .................................................. 350/358
[58] Field of Search ........................... 350/358, 162.12

[56] References Cited

U.S. PATENT DOCUMENTS 3,492,063  1/1970  Lee ....................................... 350/356
3,923,380  12/1975  Hattori et al. ........................ 350/356
4,390,247  6/1983  Freyre ................................. 350/358
4,443,066  4/1984  Freyre ................................. 350/358

Primary Examiner—John K. Corbin
Assistant Examiner—Lynn Vandenburgh Kent
Attorney, Agent, or Firm—Robert F. Rotella; Michael H. Wallach

[57] ABSTRACT

An acousto-optic deflector is shown which diffracts a beam of incident light from a zero order beam into a first order beam. Normally such diffraction deflects but 1% of the light energy within the incident beam. This deflection may be improved by successive, internal transits of the light beam across the acoustic energy wave within the deflector. Such internal transits are accomplished by forming the deflector into a cylinder and reflection coating the outer surface of that cylinder to form a mirror pair.

18 Claims, 11 Drawing Figures

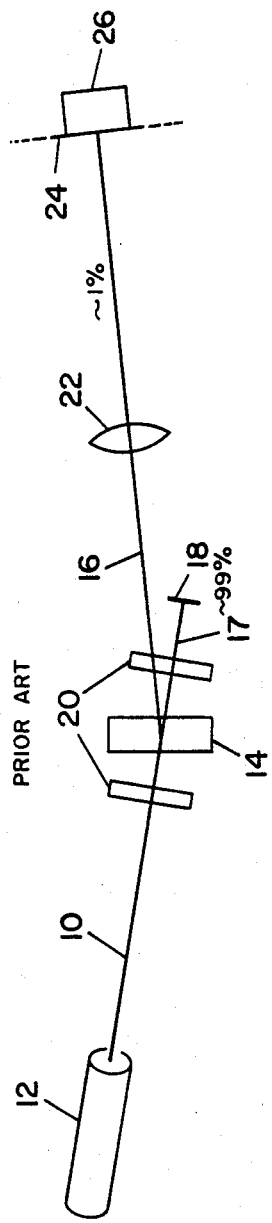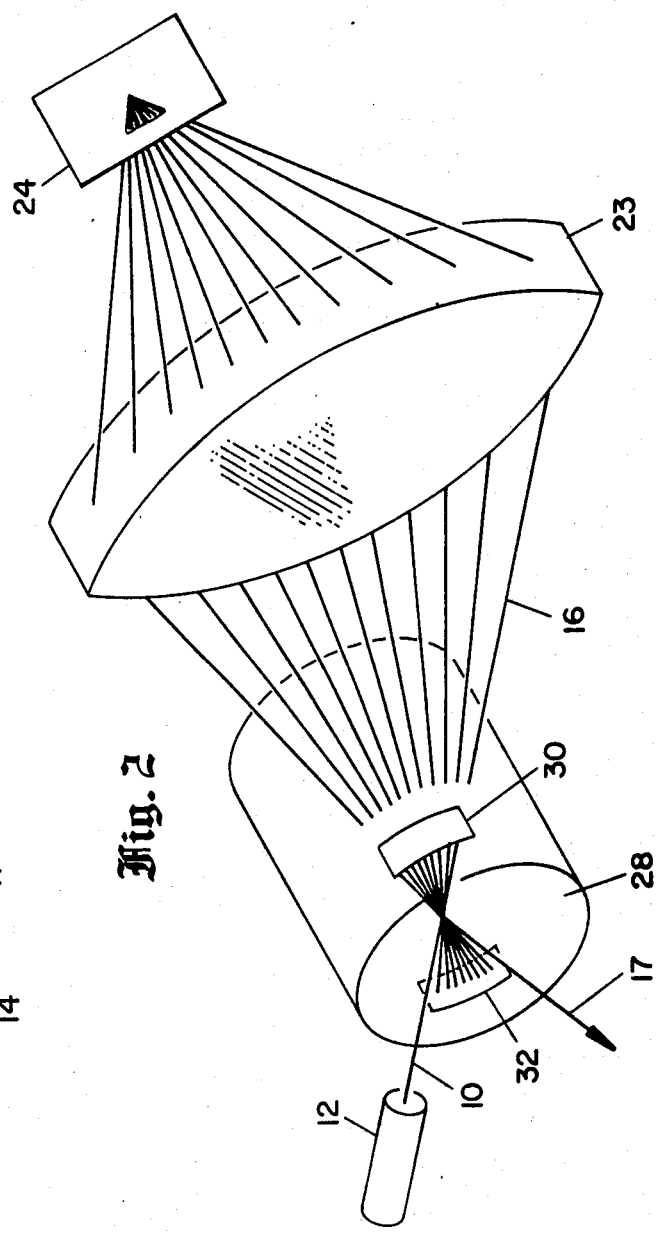

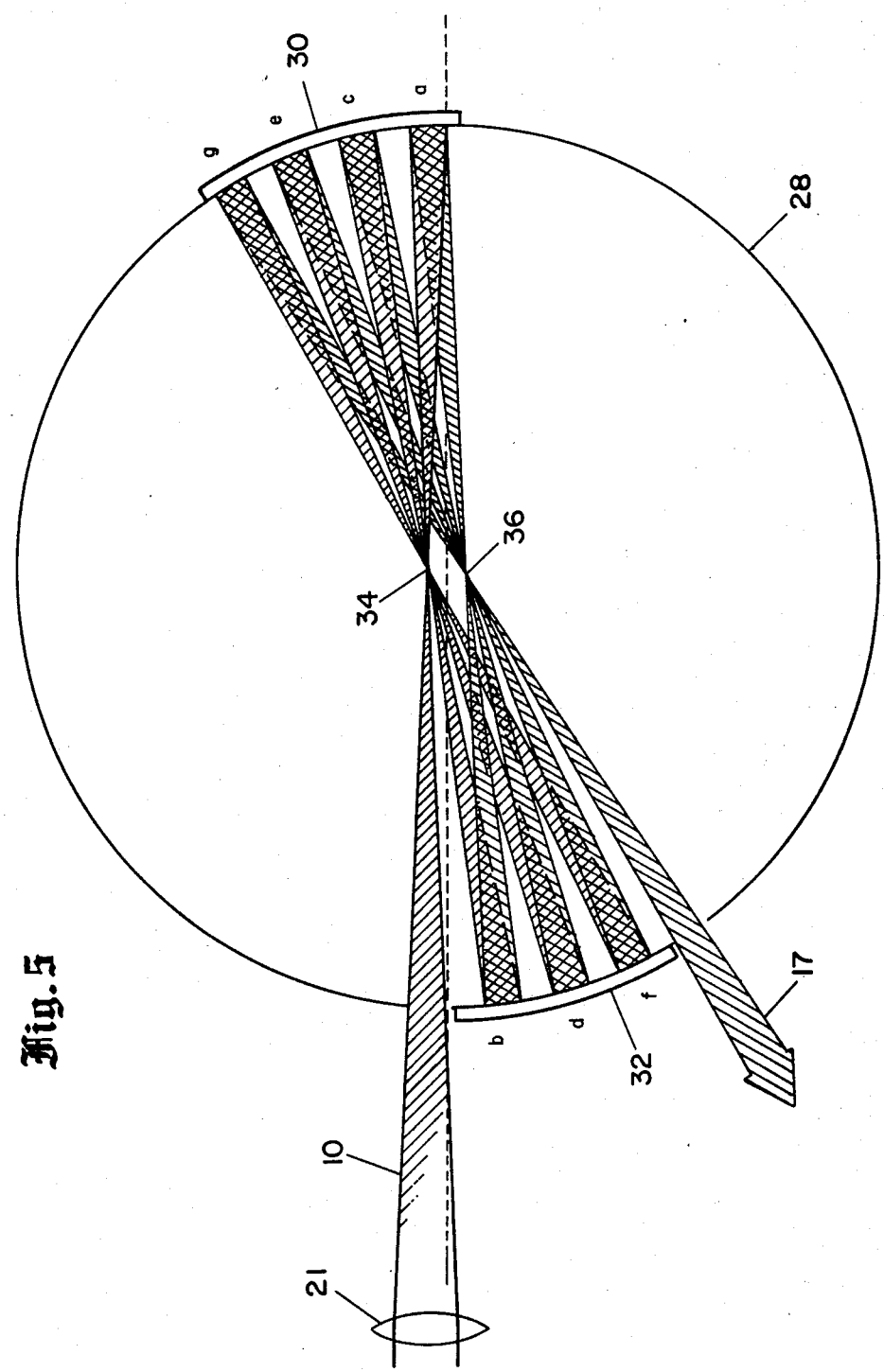

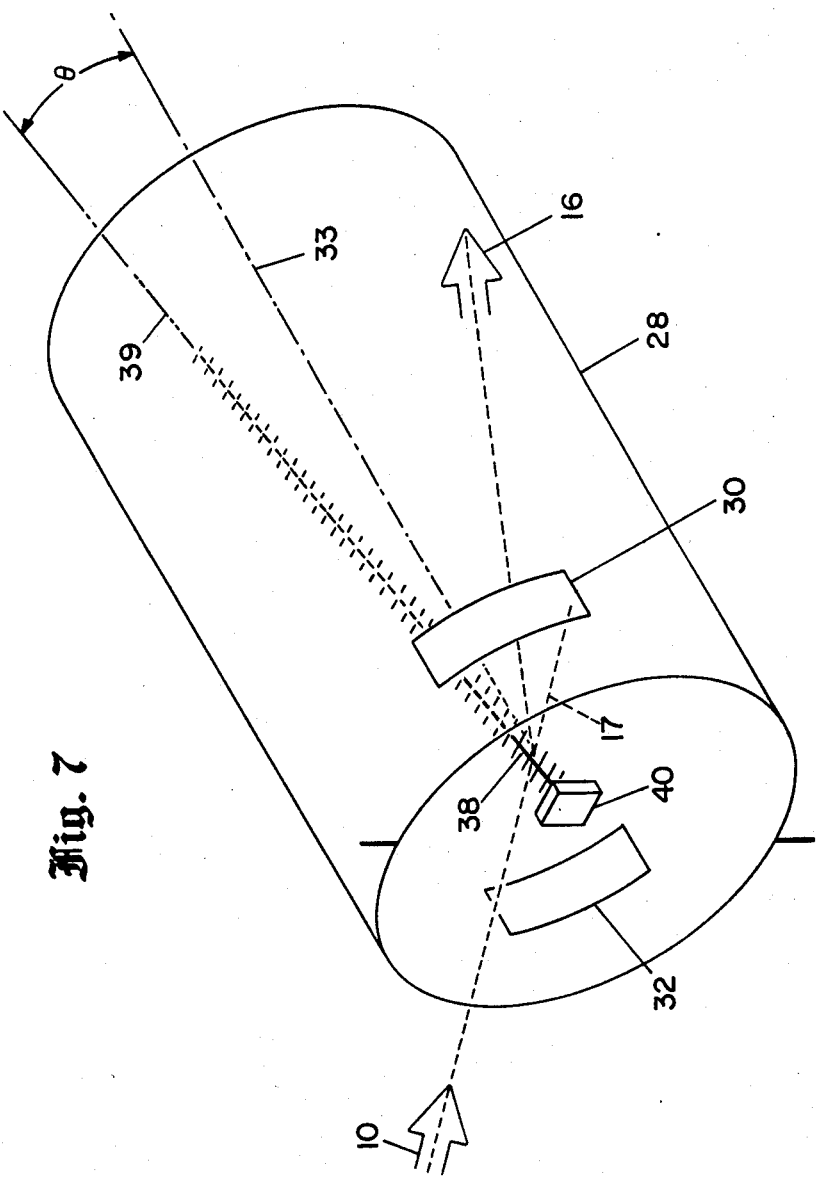

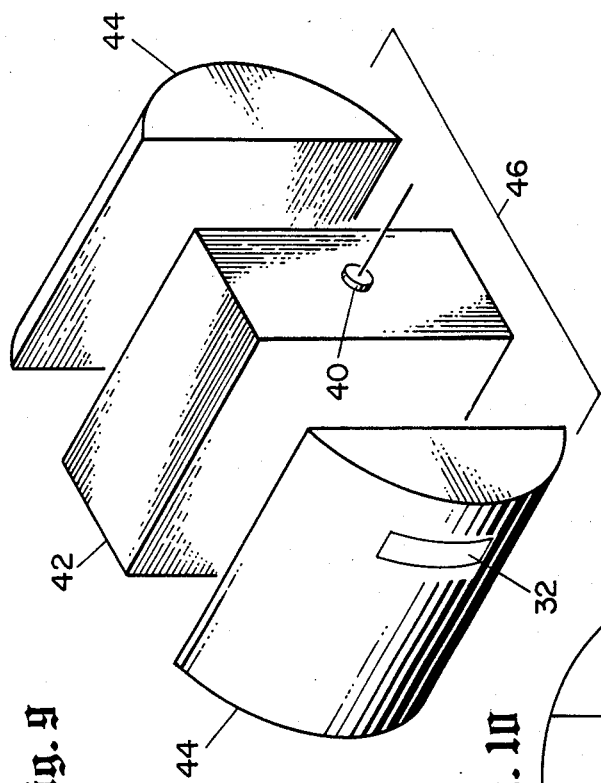
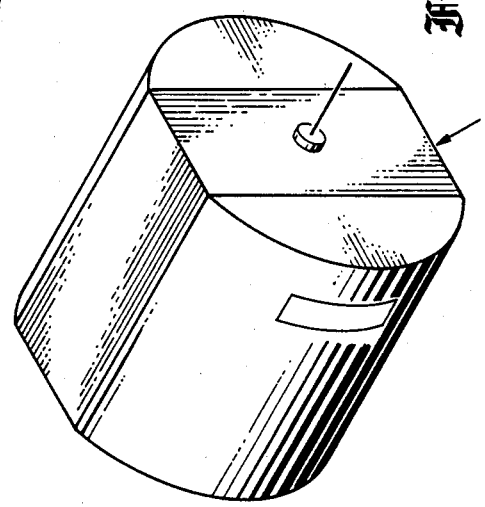
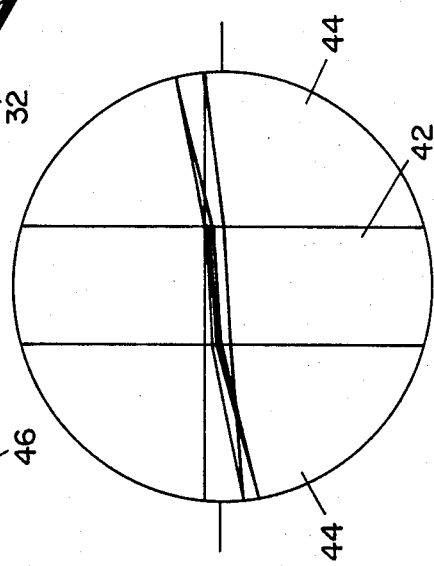

ACOUSTO-OPTIC DEFLECTOR UTILIZING INTERNAL DEFLECTION

BACKGROUND OF THE INVENTION

1. Field of the Invention

The present invention relates to a device for improving the efficiency of an acousto-optic deflector or Bragg cell by successively and internally returning the undeflected light in the zero order beam back through the acoustic wave within the cell. This allows successive acousto-optic interactions to take place for increasing the overall deflection efficiency.

2. Description of Prior Art

The term acousto-optics (A/O) refers to an interaction of light and sound. Typically an RF input signal is first transformed into an acoustic wave in a suitable crystal material, such as lithium niobate. Variation in index of refraction due to the propagation of the acoustic wave within the crystal can be then used to deflect a beam of light, usually monochromatic. This process is the equivalent of the better known Bragg diffraction of X-rays from the planes of a crystal lattice; for this reason the device is called a Bragg deflector or Bragg cell as well as an acousto-optic deflector or modulator. The angular deflection of the optical beam is proportional to the frequency of the original RF input signal. As the process is linear, multiple simultaneous RF input signals yield multiple simultaneous beam deflections corresponding to the distinct input frequencies with the intensity of the individually deflected beams being proportional to the power of the original RF input signal.

Acousto-optics has been used for a variety of applications where light must be modulated or deflected. An important application is the use of acousto-optics for wideband receiving systems. The acousto-optic phenomenon occurs over a substantial bandwidth, 1 GHz with existing devices, so that the frequency content of an unknown signal environment can be resolved by measuring the angle of deflection corresponding to each signal in the environment. Thus, the entire signal environment may be viewed simultaneously by a device that acts like a channelized receiver.

One major problem with such wideband A/O receiver systems has not yet been resolved; dynamic ranges of experimental systems are disappointingly small, on the order of 30 dB for 100 nanoseconds response time. For this technology to be applicable to a practical receiver system design, improvements in dynamic range will be required. A number of factors contribute to this problem. Wideband Bragg cells are characteristically poor deflectors of light, deflecting typically less than 1% of the available optical power. The maximum deflected optical power is limited by Bragg cell material properties, transducer power handling capability, and available laser power. The deflected light output from a typical wideband Bragg cell has a two-tone spurious response free dynamic range of about 50 dB, for two signals at maximum amplitude. A dynamic range of even 40 dB cannot normally be realized in a system, however, due to limitations associated with sensing the optical signals. Photodiode sensitivity is limited by thermal noise of diode resistance. As video bandwidth is increased to guarantee acquisition of short (100–500 nanosecond) RF pulses, the sensitivity of the diode decreases. For example, typical operating conditions of the combination of a 1 GHz lithium niobate Bragg cell and a 3 MHz video bandwidth PIN photodiode sensor limit the dynamic range to only 30 dB.

Several approaches may yield enhanced deflection efficiency for wideband Bragg cell systems. Increased transducer power handling capabilities are possible, and increased deflection efficiencies can be achieved through the use of multiple transducers. Acoustic beam steering, to optimize the interaction region of light and sound, is a further approach which may be utilized with multiple transducer designs to yield increased deflection efficiency. Each of these proposed approaches has major drawbacks, and the gains to be expected from them are relatively small.

A need therefore continues to exist for a wideband (greater than 1 GHz bandwidth) A/O system having a deflection efficiency greater than 1% per watt.

Prior art devices which incorporate electro-optic modulators have been used in surface acoustic wave (SAW) systems to control the wave. The electro-optic modulators operate to deflect a beam of electromagnetic energy by the application of an electric field to the crystaline material of the modulator. These devices use a multiplicity of passes of the beam of light to increase the beam deflection angle which is inherently small in such devices, see U.S. Pat. No. 3,492,063, by Tzuo-Chang Lee; or to create interference to modulate beam intensity, see U.S. Pat. No. 3,923,380, by Shuzo Hattori et al. and U.S. Pat. No. 3,813,142, by Carl F. Buhrer.

None of the prior art devices known address the problem of increasing the intensity of the deflected first order beam by successive returns of the undeflected light to retransit the acoustic energy wave. This basic idea is disclosed in a copending patent application filed on the same date as this application entitled "Method and Apparatus for Improving the Efficiency of an Acousto-Optic Deflector," by Edward H. David, Jr., Otis G. Zehl, and Michael G. Price, Ser. No. 342,456, filed Jan. 25, 1982.

The basic ideas of the above-identified patent application is improved upon in this application.

SUMMARY OF THE INVENTION

Accordingly, an object of the present invention is to provide an improved acousto-optic deflector.

Other objects are to provide an acousto-optic deflector which has a short optical path length and low transmission losses for improved efficiency.

Further objects are to provide an acousto-optic deflector in which successive returns of the deflected electromagnetic energy beam are confined to a small portion of the acoustic energy wave generated within the deflector and in which problems of optical alignment within the deflector are eliminated.

These and other objects are accomplished by successive, internal transits of a beam of electromagnetic energy through an acoustic energy wave formed within the acousto-optic deflector.

The successive, internal transits are accomplished by providing an acousto-optic deflector whose outer surfaces are generally cylindrical in shaped and coated with a reflective material to form a cylindrical mirror pair. As an incident beam of electromagnetic energy strikes the cylindrical surface of the deflector, it passes therethrough and is reflected from the first mirror on the opposite cylindrical surface. If the beam of electromagnetic energy passes through an acoustic energy wave, a portion of the energy is diffracted from the original path or zero order beam into a diffracted path or first order beam. The first order beam then exits the deflector, while the zero order beam strikes the first mirror and reflects back toward the second mirror to be reflected a second time through the acoustic energy wave which again diffracts light from the reflected zero order beam. This process may be repeated as many times as permitted by the geometry of the deflector.

Use of a cylindrical mirror pair requires that the incident beam of electromagnetic energy strikes the cylindrical surface at right angles to the axis of the cylinder and offset therefrom. However, as the incident beam must pass through the acoustic energy wave at an angle, the acoustic energy wave must be aligned at an angle to the axis of the cylinder.

BRIEF DESCRIPTION OF THE DRAWINGS

Other objects and advantages of the present invention will become apparent to those skilled in the art after consideration of the following specification and drawings wherein:

FIG. 1 is a schematic diagram of an acousto-optic deflector of the prior art;

FIG. 2 is a schematic diagram of an acousto-optic deflector of the present invention;

FIG. 5 shows a series of successive reflections of a focused beam;

FIG. 7 is an isometric view showing the geometry of the cylindrical deflector with its acoustic energy wave offset at an angle to the cylindrical axis of the deflector;

FIG. 9 demonstrates a first embodiment of the present invention; and

FIG. 10 illustrates a second preferred embodiment.

DETAILED DESCRIPTION OF A PREFERRED EMBODIMENT

Figure 3:
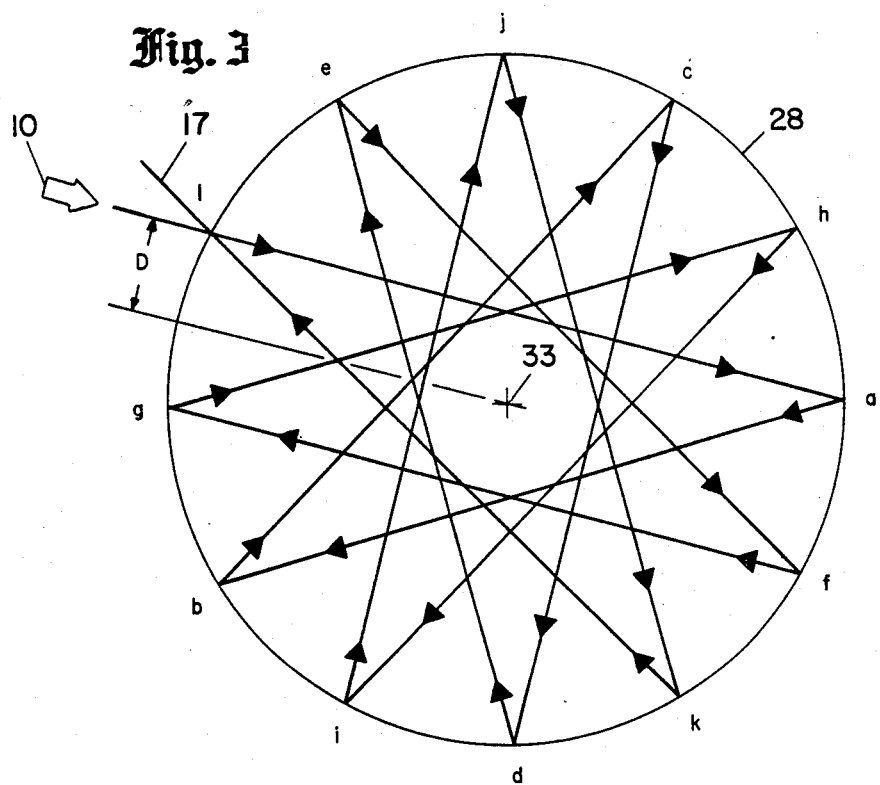
FIG. 3 is a schematic diagram showing the geometry of successive reflections of a single beam of electromagnetic energy wherein the incident beam is offset from the axis of the cylindrical deflector.

Typical operation of a prior art acousto-optic modulator may be seen in FIG. 1 wherein electromagnetic energy in the form of a light beam 10 from a source, such as a laser 12, is directed toward an acousto-optic deflector or Bragg cell 14. As the electromagnetic energy passes through the Bragg cell 14, it is deflected by diffraction caused by the passage of an acoustic energy wave through the medium of the cell 14. The deflected portion of the electromagnetic energy exits from the cell as a first order beam 16 while the remainder of the undeflected electromagnetic energy exits from the cell as a zero order beam 17. The energy in the zero order beam 17 is dissipated by an optical stop 18. A cylindrical lens pair 20 may serve to compress the electromagnetic energy into a focal point within the Bragg cell and to recollimate it upon exiting the Bragg cell.

The deflected light beam 16 passes through a transform lens 22 to appear as a blur spot on a focal plane 24 where the position and intensity are sensed by photosensor means 26. Since the deflection efficiency of a typical acousto-optic modulator is less than one percent, most of the electromagnetic energy from the light beam 10 is wasted by loss at the optical stop 18.

Utilization of a planar, multi-mirror arrangement for creating successive transits of the electromagnetic energy beam through the acousto-optic deflector was described in our above identified copending patent application entitled "Method and Apparatus for Improving The Efficiency of An Acousto-Optic Deflector." The method and apparatus described in our copending application is improved upon by utilizing a cylindrical or nearly cylindrical acousto-optic deflector 28, FIG. 2, formed from a suitable crystal material, such as Lithium Niobate. A first reflective coating 30 is placed upon the surface of cylinder 28 and arranged to intercept the zero order beam 17 of electromagnetic energy beam which passed through the acoustic energy wave. Beam 17 is reflected back toward the cylindrical surface from which it entered the deflector where it is again reflected by a second reflective coating 32. Coating 32 reflects the beam back toward coating 30 where a succession of transits are produced until the beam is walked off the edge of coating 32 where it exits the deflector 28 as the zero order beam 17. The cylindrical mirror pair formed by reflective coatings 30 and 32 is arranged with a finite length to establish the number of successive transits of the acoustic energy wave 38, FIG. 6. The application of RF energy to the Bragg cell or acousto-optic deflector 28 causes the successive transits of beam 10 to be deflected by diffraction into first order beams 16 which exit the deflector in a fan-shaped array. This array is focused by a large convex lens 23 upon the focal plane 24. The lens pair 20 has been omitted from FIG. 2 for simplicity.

Referring to FIG. 3, the incident beam 10 is shown striking the outer surface of cylinder 28, traversing that surface, reflecting off the cylindrical inner surface thereof at "a" and then reflecting again off the opposite inner surface at "b". As illustrated, it is possible to walk the successively reflected beam around the cylindrical deflector in a symmetrical pattern, a, b . . . l by selecting an offset "D" of the beam from the central axis 33 of the cylinder 28. This offset is necessary in order to prevent the beam 10 or its reflected beamlets from reflecting back upon each other.

Figure 4:
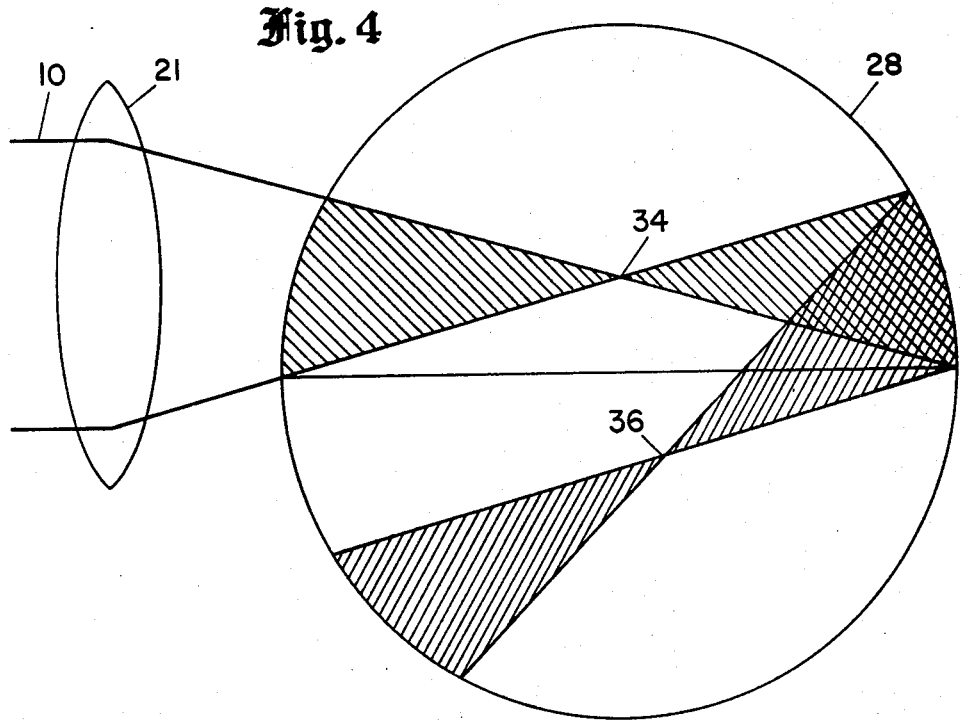
FIG. 4 shows the first reflection of an electromagnetic energy beam focused symmetrically with respect to the cylindrical axis of the deflector.

As seen in FIG. 4, the incident beam 10 may be focused by a convex lens 21 to a narrow beam or almost a point at a forward focal point 34. As the beam 10 reflects from the inner surface of the cylindrical deflector 28, it is again focused at a reverse focal point 36. Referring now to FIG. 5, it will be seen that the forward focal point 34 and reverse focal point 36 formed by a plurality of successive transits of the deflector align generally on opposite sides of a center line through the cylinder. Further, it will be noted that the focusing of the collimated light into the forward forcal point and reverse focal point permits sufficient separation to enable an acoustic energy wave formed within the deflector 28 to be focused only upon the forward focal point.

By comparing FIG. 3 with FIG. 5, it will be seen that the closer the angle of the incident beam 10 to the center line of the cylinder 28, the larger is the number of transits of light which can be focused within the sound wave. FIG. 5 illustrates the incoming beam of electromagnetic energy 10 focused by condensing lens 21 to a point or near point at forward focal point 34. Beam 10 is shown reflected a first time "a" from the reflective coating 30 back toward the reflective coating 32 which it is again reflected a second time "b" toward coating 30. After the seventh reflection "g" from coating 30, the zero order beam 17 exits the cylindrical deflector 28. While the surface of the cylindrical deflector 28 is coated with reflective coatings 30 and 32 at appropriate areas, it will be understood that the remaining surfaces are coated with an anti-reflective coating to reduce the amount of reflection generated as the zero order beam 17 or first order beam, 16 exit the Bragg cell 28.

Figure 6A:
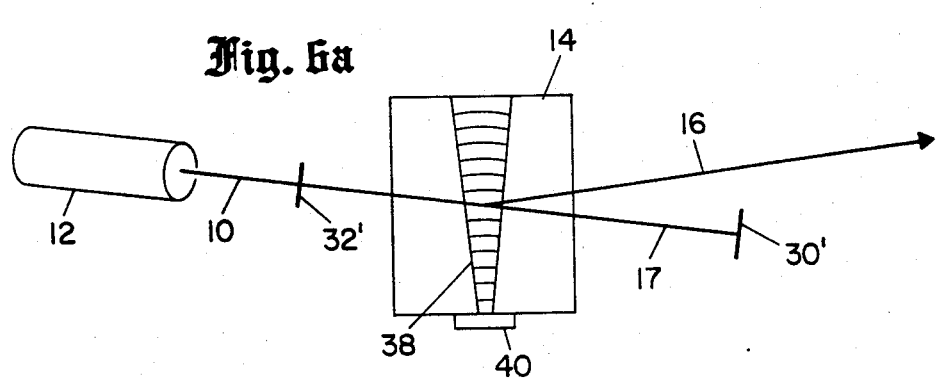
FIGS. 6a and 6b illustrate an angular offset between the cylindrical axis of the deflector and the longitudinal axis of the acoustic energy wave.
Figure 6B:
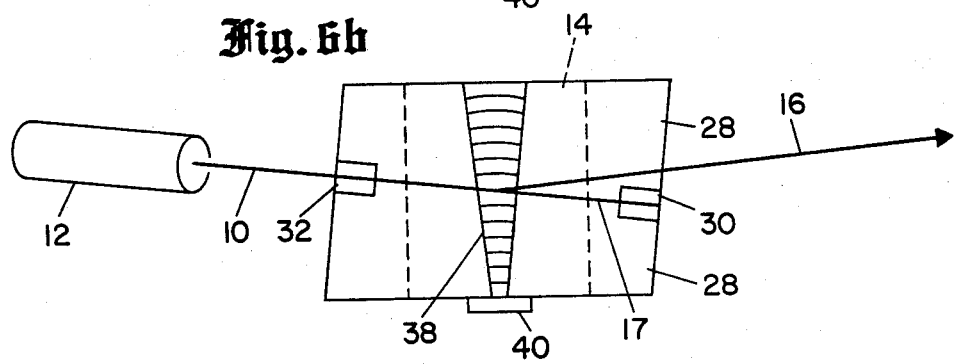

The forward focal point 34 is arranged to intersect an acoustic energy wave 38, FIG. 6. FIG. 6a illustrates a typical acousto-optic deflector or Bragg cell 14 showing the incident beam of electromagnetic energy 10 striking the surface of the Bragg cell 14 at the Bragg angle. This beam passes directly through the Bragg cell 14 as the zero order beam 17. Upon application of RF energy to a transducer 40, an acoustic energy wave 38 is generated through the Bragg cell 14. This deflects a portion of the light 10 from the zero order beam 17 into the first order beam 16 as stated above. It will be seen in FIG. 6a that the placement of a mirror 30' perpendicular to beam 17 will reflect the zero order beam back toward the laser 12. A second mirror 32', also perpendicular to beams 17 and 10, will again reflect the beam back toward mirror 30'. It may now be seen that these mirrors are arranged at an angle to the longitudinal axes of Bragg cell 14 and the acoustic energy wave 38 generated therethrough. Accordingly, it will be understood that a cylindrical Bragg cell 28 of FIG. 6b has its longitudinal axis parallel to the planes of the mirrors 30' and 32'. However, the longitudinal axis of sound beam 38 must be arranged at an angle to the longitudinal axis of the cylinder 28. This arrangement is shown in FIG. 6b wherein the cylinder 28 is superimposed over the Bragg cell 14 with the reflective coatings 30 and 32 shown in their appropriate relationship.

A three dimensional representation of the cylindrical Bragg cell 28 with mirrors 30 and 32 on the outer surface thereof and the sound wave 38 propagating therethrough at an angle $\theta$ to the cylindrical axis 33 is shown in FIG. 7.

It will be noted that the angle $\theta$ which represents the angle between the longitudinal axis 39 of sound wave 38 and the central axis 33 of cylinder 38 is offset to the left in FIG. 7. Referring once again to FIG. 6b, observe that the cylindrical axis of cylinder 28 is perpendicular to the incident beam of light 10, while the longitudinal axis of sound beam 38 and beam 10 intersect at the Bragg angle. As seen in FIG. 7, one method of manufacturing the cylindrically shaped acousto-optic demodulator 28 to obtain the configuration shown is to machine a cylinder of acousto-optic material and then machine one end of the cylinder as a planar surface that intersects the longitudinal axis of the cylinder 28 at an acute angle equal to the complement of the Bragg angle.

Figure 8:
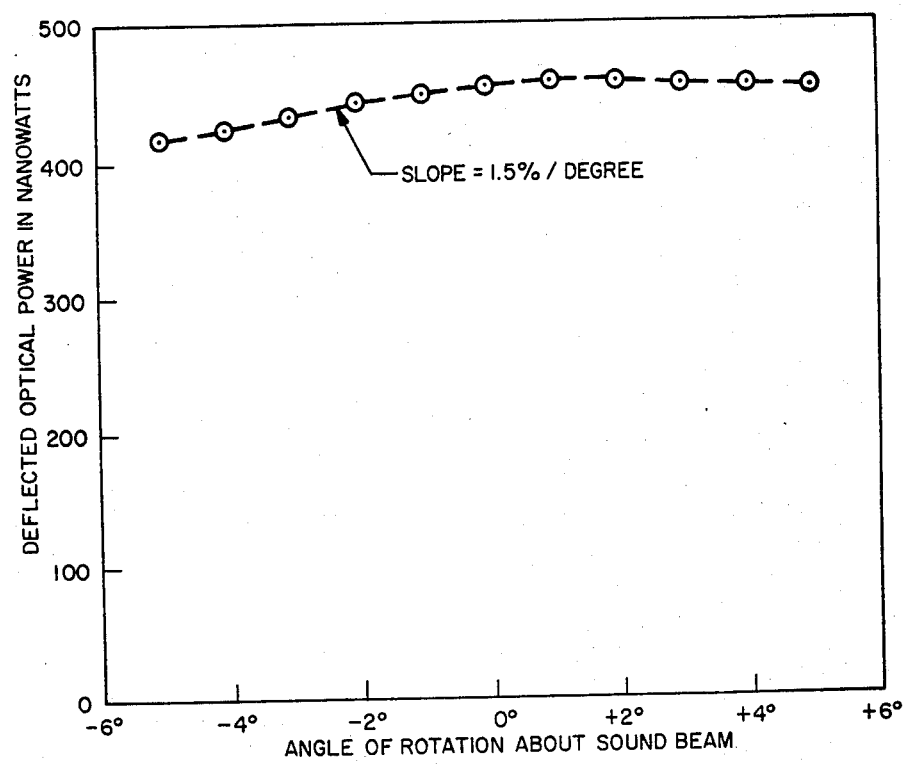
FIG. 8 shows an experimental measurement of the sensitivity of an acousto-optic deflector to rotation about the acoustic energy wave demonstrating that Bragg cell interaction will be present in successive reflections.

Referring to FIG. 8, an experimental measurement of the sensitivity of a Bragg cell capable of 1 GHz bandwidth is shown wherein the Bragg cell has been rotated about the sound beam between ±5°. The resulting graph shows deflected optical power in nanowatts versus angle of rotation about the sound beam. The deflected electromagnetic energy or first order beam 16 undergoes a change in its deflection over the ±5° rotation of 1.5%/degree. This demonstrates that Bragg cell interaction is perserved for successive reflections.

Referring now to FIG. 9, a second embodiment of the present invention is disclosed. Recall that the cylindrical modulator 28 shown in FIG. 7 is manufactured from a solid piece of acousto-optic material such as Lithium Niobate. However, Lithium Niobate is a soft, brittle material which is difficult to machine. This difficulty may be overcome by manufacturing the cylindrical modulator 28 from a plurality of pieces. For example, the Lithium Niobate acousto-optic modulator 42 may be manufactured with a quadrilateral cross-section, such as a square or rectangle. Attached to opposite surfaces of the more generally square cross-section shown in FIG. 9 by an antireflective bond are a pair of glass lenses 44 which may be ground by techniques well known in the industry. The glass lenses 44 must be machined with their outer cylindrical surfaces offset from their flat, deflector mating surfaces by an angle equal to the Bragg angle. The advantage of this arrangement is that lenses 44 may be more easily replaced to adjust the focuses of the resultant modulator 46.

As shown in FIG. 10, the acousto-optic deflector 42 may be formed with a more generally rectangular rather than a square cross-section. In fact, it is advantageous to use a rectangular cross-section thus permitting a larger percentage of the modulator 46 to be constructed from easier to machine glass. FIG. 10 illustrates a sequence of four successive reflections of a single ray. Note that the central slab 42, which may be formed from Lithium Niobate, will normally have a higher index of refraction than glass. Lithium Niobate has an index of refraction of 2.2 while glass has an index of refraction of approximately 1.6. The higher index of refraction of a modulator 42 over the lenses 44 tends to confine the optical beam 10 along the optical axis, as shown schematically in FIG. 10. This lensing effect is an additional valuable feature of the multipiece embodiments described in FIGS. 9 and 10.

From the foregoing, it will be apparent that successive transits of the acousto-optic modulator may be accomplished without transmission in air so that large optical transmission losses are eliminated. Successive transmissions are confined to a small portion of the sound beam through the utilization of lens 20 (FIG. 5) or the lensing effect (FIG. 10). This reduces or eliminates the effects of acoustic attenuation. The optical path of the successive transits of the zero order beam 17 is much shorter than accomplished internally rather than by externally as described in our copending patent application. In the copending patent application as HeNe laser was used which has a coherence length in excess of a meter. In this earlier work, use of the HeNe source with planar mirrors for successive transits presented no problem with coherence loss due to return loop phase delay. However, should one wish to use a GaAs laser, with a much shorter coherence length, the external planar mirror reflection approach is not desirable. Thus, the shorter optical path becomes important if a different source of electromagnetic energy is considered. Because the mirrors 30 and 32 are deposited directly upon the cylindrical surface of modulator 28, optical alignment stability has been much improved. The mirrors also exhibit a self-focusing property which keeps a large optical power density within the sound beam.

The preferred embodiments described in the present invention permit a large number of optical returns. It has been found that the performance improvement of the present invention is at least 10 dB over that of a standard cell utilizing a single transit path configuration. While the preferred embodiments have been described as monolithic or 3 piece modulators, it will be understood that other variations are possible. Accordingly, the present invention should be limited only by the appended claims.

We claim:

1. An acousto-optic system comprising:
   a source of electromagnetic energy which forms a beam thereof;
   an acousto-optic deflector into which said beam of electromagnetic energy is directed to exit as a zero order beam;
   means for generating an acoustic energy wave within said deflector through which said beam of electromagnetic energy transits for diffracting a first order beam from said zero order beam; and
   means within said deflector for intercepting said zero order beam and internally redirecting said zero order beam through successive transits of said acoustic energy wave to diffract additional energy from said beam of electromagnetic energy into said first order beam for improving the efficiency of said acousto-optic system.

2. An acousto-optic system, as claimed in claim 1, wherein:
   said means within said deflector for intercepting said zero order beam includes a reflective coating upon a curved surface of the medium which forms said deflector for reflecting said zero order beam through successive transits of said acoustic energy wave.

3. An acousto-optic system, as claimed in claim 1, wherein:
   said reflective coating upon said curved surface includes a mirror pair of reflective coatings and said curved surface is cylindrical.

4. An acousto-optic system, as claimed in claim 3, wherein:
   said beam of electromagnetic energy is directed into said deflector along a line prependicular to and offset from the longitudinal axis of the cylindrically shaped medium which forms said deflector.

5. An acousto-optic system, as claimed in claim 1, additionally comprising:
   means for focusing said beam of electromagnetic energy into a focal point within said acoustic energy wave.

6. An acousto-optic system as claimed in claim 5, wherein:
   said acousto-optic deflector is cylindrically shaped having a longitudinal axis;
   said means for focusing said beam of electromagnetic energy into a focal point focuses said energy into said point on one side of said longitudinal axis of said cylinder, while said means for redirecting said electromagnetic energy reflects said energy into a focal point on the other side of said longitudinal axis.

7. An acousto-optic system as claimed in claim 1, additionally comprising:
   said acousto-optic deflector cylindrically shaped with a longitudinal axis;
   said means for generating an acoustic energy wave generating a wave which is offset at an angle to said longitudinal axis; and
   means for focusing said beam of electromagnetic energy into a focal point within said acoustic energy wave.

8. An acousto-optic system, as claimed in claim 1, additionally comprising:
   said acousto-optic deflector formed with a substantially cylindrical shape from three elements including an inner and two outer elements;
   said two outer elements having a cross-sectional area in the shape of a segment on a chord; and
   said inner element having a cross-sectional area in the shape of a convex quadrilateral.

9. An acousto-optic system as claimed in claim 8, wherein:
   said inner element has a cross-sectional area in the shape of a square.

10. An acousto-optic system, as claimed in claim 8, wherein:
    said inner element has a cross-sectional area in the shape of a rectangle.

11. An acousto-optic system, as claimed in claim 8, wherein:
    said inner element is formed from an acousto-optic medium and said outer elements are formed from a transparent medium.

12. An acousto-optic system, comprising:
    a source for forming a beam of electromagnetic energy;
    an acousto-optic deflector having a generally cylindrical shape about a central axis;
    means for generating an acoustic energy wave within said deflector which traverses said deflector at an angle to said central axis;
    means for focusing said beam of electromagnetic energy into a focal point within said acoustic energy wave wherein said beam of energy passes therethrough as a zero order beam or is diffracted therefrom as a first order beam;
    reflective means coated upon the outer surface of said generally cylindrical deflector to internally reflect said zero order beam of electromagnetic energy for successive transits of said beam through said acoustic energy wave for increasing the amount of electromagnetic energy diffracted from said zero order beam into said first order beam with each transit of said acoustic energy wave.

13. An acousto-optic system, as claimed in claim 12, wherein:
    said beam of electromagnetic energy enters the generally cylindrical shape of said deflector perpendicular to the outer surface thereof and offset from the central axis thereof;
    said reflective means coated upon the outer surface of said deflector includes a pair of mirrors wherein the mirror closest to said entering beam is coated upon said outer surface of said deflector inside said offset of said beam from said central axis.

14. An acousto-optic system, as claimed in claim 12, wherein:
    said acousto-optic deflector is formed with a generally cylindrical shape having an inner and two outer elements.

15. An acousto-optic system, as claimed in claim 14, wherein:
    said inner element has a convex quadrilateral cross-sectional area and said outer elements have cross-sectional areas in the form of a segment on a chord.

16. An acousto-optic system, as claimed in claim 15, wherein:
    said convex quadilateral is a square.
17. An acousto-optic system as claimed in claim 15, wherein:
    said convex quadrilateral is a rectangle.
18. A method for improving the amount of electromagnetic energy deflected into a first order beam by an acousto-optic deflector, comprising the steps of:
    directing a beam of electromagnetic energy into an acousto-optic deflector wherein said beam passes through an acoustic-energy wave generated within said deflector which deflects said first order beam from a zero order beam;
    internally directing said zero order beam through successive transits of said acoustic energy wave by internally reflecting said zero order beam from the inner surface of said deflector wherein the amount of electromagnetic energy deflected into said first order beam from said zero order beam is increased with each successive transit to improve the efficiency of said acousto-optic deflector.

* * * * *